United States Patent
Khamis et al.

(10) Patent No.: US 10,803,687 B1
(45) Date of Patent: Oct. 13, 2020

(54) SYSTEMS AND METHODS FOR RECOGNIZING DRIVER/PASSENGER'S INTENT TO ENTER VEHICLE FOR MANAGING PROXEMICS INTERACTION

(71) Applicant: GM GLOBAL TECHNOLOGY OPERATIONS LLC, Detroit, MI (US)

(72) Inventors: Alaa M. Khamis, Ontario (CA); Roddi L. MacInnes, Ontario (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/558,742

(22) Filed: Sep. 3, 2019

(51) Int. Cl.
*G07C 9/00* (2020.01)
*B60R 16/037* (2006.01)
*B60R 25/24* (2013.01)

(52) U.S. Cl.
CPC ........ *G07C 9/00309* (2013.01); *B60R 16/037* (2013.01); *B60R 25/24* (2013.01); *B60R 2325/101* (2013.01); *B60R 2325/205* (2013.01); *G07C 2009/00341* (2013.01); *G07C 2009/00547* (2013.01)

(58) Field of Classification Search
CPC ...... G07C 9/00309; G07C 2009/00341; G07C 2009/00547; G07C 2209/63; G07C 2209/64; B60R 16/037; B60R 25/24; B60R 2325/101; B60R 2325/205

USPC ........................................................ 340/5.72
See application file for complete search history.

(56) References Cited

U.S. PATENT DOCUMENTS

| | | | | |
|---|---|---|---|---|
| 6,631,271 | B1* | 10/2003 | Logan ..................... | G06F 3/002 455/456.1 |
| 2003/0038732 | A1* | 2/2003 | Watarai .................. | G08C 19/22 340/12.22 |
| 2004/0178883 | A1* | 9/2004 | Haselsteiner ...... | G07C 9/00309 340/5.72 |
| 2007/0162191 | A1* | 7/2007 | Matsubara ......... | G07C 9/00309 701/1 |
| 2019/0230471 | A1* | 7/2019 | Golgiri .................... | G01S 5/00 |

* cited by examiner

*Primary Examiner* — Edwin C Holloway, III (57) ABSTRACT

A system implemented in a vehicle, the system comprises a sensing module, a zone determination module, and an intent determination module. The sensing module is configured to sense a signal from a mobile device proximate to the vehicle. The zone determination module is configured to determine locations of the mobile device in a plurality of zones around the vehicle based on the signal. A sequence of the locations indicates movement of the mobile device in the plurality of zones. The intent determination module is configured to select weights according to a set of rules to apply to successive locations in the sequence, determine an intent indicator of whether a person carrying the mobile device intends to enter the vehicle by applying the selected weights to the successive locations in the sequence, and generate an output to perform one or more operations in the vehicle based on the intent indicator.

20 Claims, 7 Drawing Sheets

SYSTEMS AND METHODS FOR RECOGNIZING DRIVER/PASSENGER'S INTENT TO ENTER VEHICLE FOR MANAGING PROXEMICS INTERACTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for recognizing a driver/passenger's intent to enter a vehicle for managing proxemic interaction between the driver/passenger and the vehicle.

Nowadays when a person carrying car keys approaches his or her vehicle, the vehicle may turn on its lights and/or briefly sound a horn or an alarm. While this helps in locating the vehicle in parking lots, it can drain the vehicle's battery if the person does not enter the car since the lights typically stay on for some time. The situation can be exacerbated if the person carrying the car keys is performing an activity in the vicinity of the vehicle such as working in the garage, playing with children, mowing the lawn, clearing the snow, and so on. During such activity, the vehicle continues to sense the presence of the car keys near the vehicle and continues to turn on the lights, for example, assuming that the person is about to enter the vehicle. The consequent draining of the vehicle's battery and the nuisance caused by the sounds of the horn or the alarm can be annoying.

SUMMARY

A system implemented in a vehicle, the system comprises a sensing module, a zone determination module, and an intent determination module. The sensing module is configured to sense a signal from a mobile device proximate to the vehicle. The zone determination module is configured to determine locations of the mobile device in a plurality of zones around the vehicle based on the signal. A sequence of the locations indicates movement of the mobile device in the plurality of zones. The intent determination module is configured to select weights according to a set of rules to apply to successive locations in the sequence. The intent determination module is configured to determine an intent indicator of whether a person carrying the mobile device intends to enter the vehicle by applying the selected weights to the successive locations in the sequence. The intent determination module is configured to generate an output to perform one or more operations in the vehicle based on the intent indicator.

In other features, the one or more operations include turning on one or more lights, sounding a horn, booting an infotainment module, adjusting a seat, turning on an air conditioning system, and turning on ignition.

In another feature, the system further comprises an authentication module configured to authenticate the mobile device by performing a security handshake with the mobile device.

In other features, the system further comprises a feature extraction module configured to extract data from the signal and to output a feature vector based on the extracted data. The zone determination module comprises a model trained to determine the locations of the mobile device in the plurality of zones based on the feature vector.

In another feature, the sensing module comprises one or more sensors configured to communicate with the mobile device using a short-range wireless communication protocol.

In other features, the zone determination module comprises a model trained to determine the locations of the mobile device in the plurality of zones. The model is trained based on a type of a sensor used in the sensing module, a location of the sensor in the vehicle, a type of the mobile device, and a communication protocol used by the sensor to communicate with the mobile device.

In other features, the sensing module comprises one or more Bluetooth sensors, and the signal includes a Bluetooth Low Energy signal.

In another feature, the intent determination module is configured to determine the intent indicator of whether a person carrying the mobile device intends to enter the vehicle by analyzing pairwise transitions of the mobile device between the plurality of zones around the vehicle and by using the weights corresponding to the pairwise transitions.

In another feature, the intent determination module is configured to prevent repeated performance of the one or more operations in the vehicle in response to sensing repeated movements of the mobile device between the plurality of zones by using a plurality of adaptive timers until determining that the person carrying the mobile device intends to enter the vehicle.

In still other features, a non-transitory computer-readable medium stores instructions for execution by a processor. The instructions comprise first instructions for processing a signal received from a sensor in a vehicle in response to sensing a mobile device proximate to the vehicle. The instructions comprise second instructions for extracting data from the signal and determining locations of the mobile device in a plurality of zones around the vehicle. A sequence of the locations indicates movement of the mobile device in the plurality of zones. The instructions comprise third instructions for selecting weights according to a set of rules to apply to successive locations in the sequence, determining an intent indicator of whether a person carrying the mobile device intends to enter the vehicle by applying the selected weights to the successive locations in the sequence, and generating an output to perform one or more operations in the vehicle based on the intent indicator.

In other features, the one or more operations include turning on one or more lights, sounding a horn, booting an infotainment module, adjusting a seat, turning on an air conditioning system, and turning on ignition.

In another feature, the instructions further comprise fourth instructions for performing a security handshake with the mobile device and authenticating the mobile device.

In other features, the instructions further comprise fourth instructions for determining a feature vector based on the extracted data, inputting the feature vector to a model trained to determine the locations of the mobile device in the plurality of zones based on the feature vector, and receiving from the model the locations of the mobile device in the plurality of zones around the vehicle.

In other features, the instructions further comprise fourth instructions for determining the locations of the mobile device in the plurality of zones using a model trained based on a type of the sensor, a location of the sensor in the vehicle, a type of the mobile device, and a communication protocol used by the sensor to communicate with the mobile device.

In still other features, a method comprises a mobile device proximate to a vehicle sensing a signal from a transmitter in the vehicle. The method further comprises determining locations of the mobile device in a plurality of zones around the vehicle based on the signal. A sequence of the locations indicates movement of the mobile device in the plurality of zones. The method further comprises selecting weights according to a set of rules to apply to successive locations in the sequence. The method further comprises determining an intent indicator of whether a person carrying the mobile device intends to enter the vehicle by applying the selected weights to the successive locations in the sequence. The method further comprises performing one or more operations in the vehicle based on the intent indicator.

In other features, the one or more operations include turning on one or more lights, sounding a horn, booting an infotainment module, adjusting a seat, turning on an air conditioning system, and turning on ignition.

In another feature, the method further comprises authenticating the mobile device by performing a security handshake with the mobile device.

In other features, the method further comprises extracting data from the signal, determining a feature vector based on the extracted data, inputting the feature vector to a model trained to determine the locations of the mobile device in the plurality of zones based on the feature vector, and receiving from the model the locations of the mobile device in the plurality of zones around the vehicle.

In other features, the method further comprises determining the locations of the mobile device in the plurality of zones using a model trained based on a type of a sensor, a location of the sensor in the vehicle, a type of the mobile device, and a communication protocol used by the sensor to communicate with the mobile device.

In another feature, the method further comprises communicating with the mobile device using a short-range wireless communication protocol.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure relates to systems and methods for recognizing the intent of a driver/passenger to enter a vehicle using sensors in the vehicle that can sense an object carried by the driver/passenger using a short range wireless communication protocol. For example, the sensor in the vehicle may include a Bluetooth sensor, an Ultra Wide Band (UWB) sensor, a Wi-Fi antenna, or some other suitable sensor; and the object carried by the driver may include a mobile communication device such as a smartphone, a key fob, and so on. For example, the sensor in the vehicle may sense a signal transmitted by the object carried by the driver. Alternatively, depending on the type of the short-range communication protocol utilized by the object, the sensing may be performed by transmitting a signal from the sensor in the vehicle to the object and by sensing a response transmitted by the object.

Throughout the present disclosure, Bluetooth Low Energy (BLE) sensors are used for example only, and the disclosure is not limited to BLE sensors. Further, the teachings of the present disclosure are not limited to vehicles. Rather, the teachings can be extended and applied to proximity-based automation of homes; personal computing devices in homes and offices; heating, ventilation, and air conditioning (HVAC) systems in homes and offices; and so on. For example, by sensing proximity of people as described in the present disclosure, a home can be locked/unlocked; garage doors of homes and other buildings can be opened/closed; computer systems at work and/or at home can be turned on/off; lighting, air conditioning, and/or entertainment systems in homes can be turned on/off.

Briefly, in the systems and methods of the present disclosure, when a person carrying a mobile phone is in the vicinity of a vehicle, one or more BLE sensors in the vehicle can sense the BLE signals from the mobile phone, and the mobile phone is authenticated. Parameters such as received signal strength indicator (RSSI) or time of flight of the Bluetooth signals sensed by the one or more sensors in the vehicle are measured to predict the intent of the driver to enter the vehicle. Discriminative features are extracted from the sensed Bluetooth signals and are used to train a machine learning model to determine a region where the phone (and therefore the driver) is located relative to the vehicle. Pairwise RSSI interactions between multiple regions (explained below) are used to refine the region determination process. The driver's intent to enter the vehicle is then predicted by analyzing the pairwise transitions between the regions using a set of observations and heuristic weights. Localizing the driver and predicting his/her intent to enter the vehicle can be used to efficiently manage social interactions between the vehicle and the driver.

For example, based on the determined intent, the vehicle can be configured to provide various responses while efficiently managing the battery and other resources in the vehicle. For example, after confirming the driver's intent to enter the vehicle, before the driver enters the vehicle, the vehicle can turn on the lights, sound a horn or an alarm, provide an auditory greeting, adjust the driver's seat if necessary, wake up an infotainment system (which takes a while to boot), turn on the HVAC system, open sunroof, open trunk, operate lift-gate/tailgate, and so on. Thus, intent recognition can be used for managing different human to machine interaction (HMI) and personalization applications in the vehicle.

Figure 1:
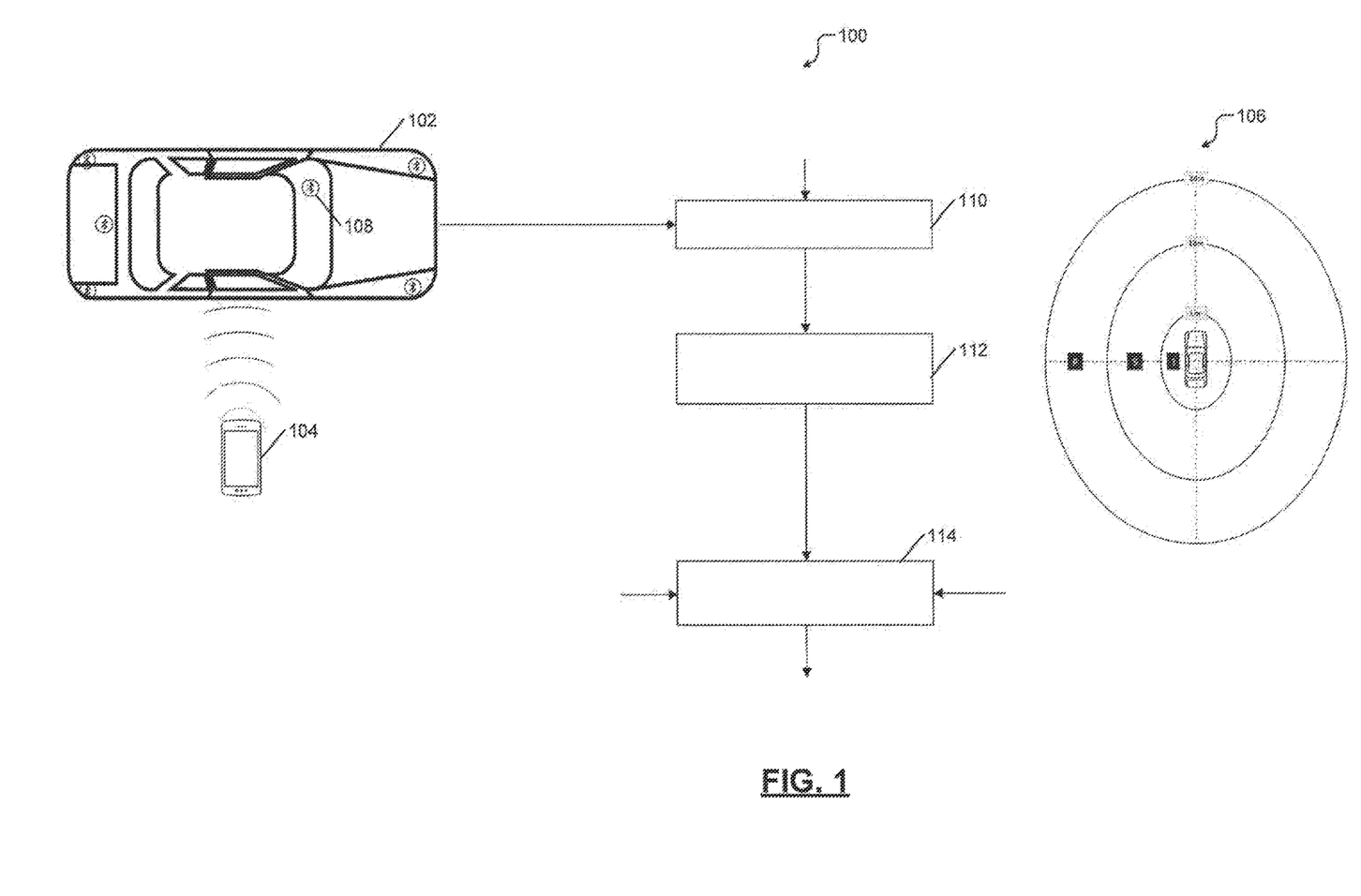
FIG. 1 shows a system for recognizing the intent of a driver/passenger to enter a vehicle according to the present disclosure.

FIG. 1 shows an example of a system 100 for recognizing the intent of a driver/passenger to enter a vehicle according to the present disclosure. For example, the system 100 comprises a vehicle 102 and a mobile device 104. For example only, as shown at 106, the area around the vehicle 102 may be divided into a plurality of zones. For example only, three zones are shown: P (public, farthest from the vehicle 102), I (intimate, closest to the vehicle 102), and S (social, between P and I). For example only, the intimate zone I covers an area of about 1 meter surrounding the vehicle 102; the social zone S covers an area of about 10 meters surrounding the vehicle 102 (i.e., about 1-10 meters surrounding the I zone); and the public zone P covers an area of about 20 meters surrounding the vehicle 102 (i.e., about 10-20 meters surrounding the S zone). The number of zones and their respective ranges or distances from the vehicle 102 can be different than those shown.

For example only, the vehicle 102 is shown to include six BLE sensors 108 arranged at different locations inside and outside the vehicle 102. The type and number of sensors and their locations can be different. For example, in some implementations, a single sensor near the center of the roof of the vehicle 102 may suffice. Using more sensors, however, can improve directional sensing of the mobile device 104.

The number and arrangement (i.e., locations) of the sensors in the vehicle 102 and the type of mobile device 104 are considered extrinsic parameters of the system 100. The sensing technology used (e.g., Bluetooth Low Energy (BLE), Ultra Wide Band (UWB), Radar, Ultrasound, etc.), the frequency band (range) used, and the broadcast/reporting/sampling rate of the sensors are considered intrinsic parameters of the system 100. These parameters can be varied (i.e., selected). Once selected, these parameters are used to train the models described below.

The vehicle 102 includes a feature extraction module 110, a zone determination model 112, and an intent recognition model 114. The sensors 108 sense the mobile device 104. Once the mobile device 104 is authenticated, the zone determination model 112, which is trained based on the selected intrinsic and extrinsic parameters described above, begins tracking the location of the mobile device 104 (i.e., begins locating or localizing the mobile device 104). The zone determination model 112 is trained for a set of extrinsic and intrinsic parameters, which depend on the type of the mobile device 104 and the type and configuration of the sensors 108 selected and used in the system 100.

The feature extraction module 110 extracts discriminative features (explained below) from the signals output by the sensors 108 based on RSSI values (or time of flight data) of the signals. The feature extraction module 110 may also incorporate pairwise interactions between the signals of the sensors 108. For example, when six sensors are used as shown, after omitting self-interaction of each sensor, ((6× 6)−6)=30 pairwise interactions between the signals of the six sensors can be used. Features can be also learned using trainable feature extractor or learnable kernel as part of an end-to-end zone determination model 112.

The zone determination model 112 is trained to recognize the location of the mobile device 104 based on the extracted features. For example, the zone determination model 112 is trained to recognize the location of the mobile device 104 within the three zones P, S, and I as shown. More fine-grained discretization schemes can be used with more computational resources.

The intent recognition model 114 predicts the driver's intent to enter the vehicle 102. The intent recognition model 114 predicts the driver's intent by analyzing the pairwise transitions between the regions (i.e., zones). The intent recognition model 114 analyzes the pairwise transitions using a set of observations of the transitions across the different zones and by applying heuristic weights empirically assigned to the transitions as explained below in detail.

The system 100 endows the vehicle 102 with the capability of localizing the driver (i.e., the person carrying the mobile device 104) and predicting his/her intent to enter the vehicle 102 before he/she actually enters the vehicle 102. This information can be used to facilitate interaction between the vehicle 102 and the driver and can enable different HMI and personalization applications. Examples of the applications include but are not limited to the following: activating welcome lighting as a visual cue, providing auditory greeting as an auditory cue, turning on the HVAC system in the vehicle 102, adjusting the seat, and/or waking up the infotainment unit as a physical cue, and so on.

Figure 2A:
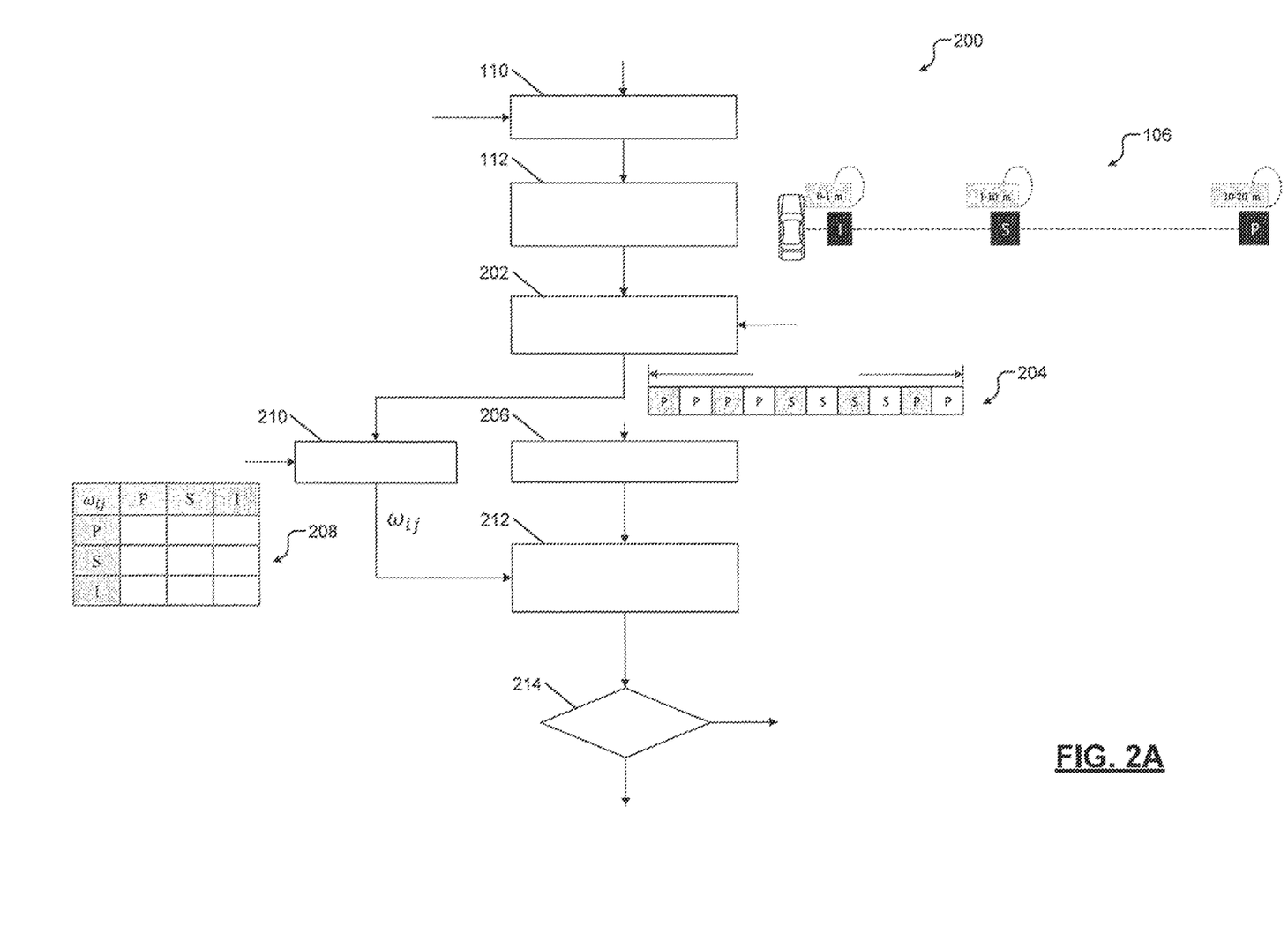
FIGS. 2A and 2B show a method for recognizing the intent of a driver/passenger to enter a vehicle according to the present disclosure.
Figure 2B:
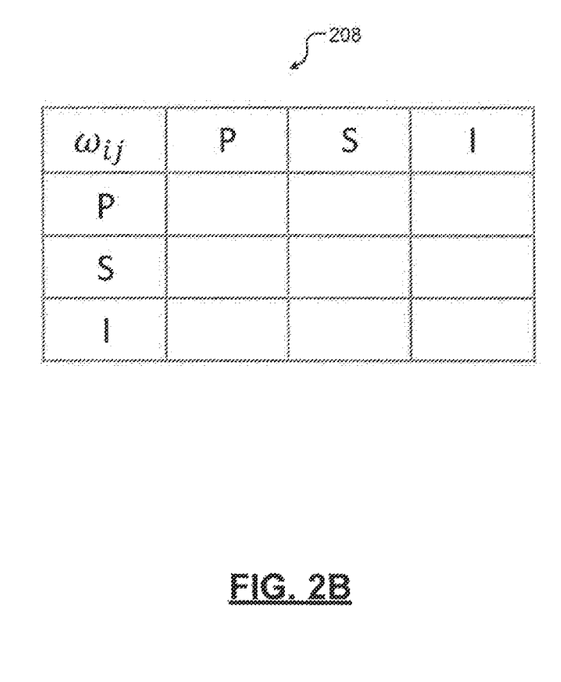

FIGS. 2A and 2B show an example of a method 200 for recognizing the intent of a driver to enter a vehicle according to the present disclosure. For example, in FIG. 2A, the driver carrying the mobile device 104 may be in the vicinity of the vehicle 102. The sensors 108 may sense the mobile device 104 and may output respective signals. Once the mobile device 104 is authenticated (e.g., confirmed to be a device paired with the vehicle 102) based on the output signals of the sensors 108, the feature extraction module 110 extracts features from the signals output by the sensors 108. The feature extraction module 110 extracts the features for which the zone determination model 112 is trained.

For example, the feature extraction module 110 may convert the signals from the sensors 108 from time domain to frequency domain, statistical domain, and so on. The converted data of the independent variables has a stronger correlation with the dependent variable being predicted than the raw data from the sensors 108. For example, the independent variable may be RSSI or time of flight of the signals received from the sensors 108, and the dependent variable may be the distance or zone where the mobile device 104 is located relative to the vehicle 102.

For example, the feature extraction module 110 may determine rolling statistics including mean and/or standard deviation of a parameter (e.g., RSSI or time of flight) of a signal from a sensor over a one second moving window. The extracted feature (e.g., the rolling statistics) is input as a feature vector to the zone determination model 112. The zone determination model 112 is trained to predict the distance from the vehicle 102 or the zone where the mobile device 104 is located relative to the vehicle 102 based on the feature vector (e.g., the rolling statistics). Accordingly, the zone determination model 112 predicts the distance or the zone where the mobile device 104 is located relative to the vehicle 102 based on receiving the feature vector (e.g., the rolling statistics).

For example, at an interval of every one second, the zone determination model 112 may output an indication of a zone in which the mobile device 104 is located. At 202, based on the outputs of the zone determination model 112, an observation vector 204 is formed. The observation vector 204 shows zone transitions (i.e., a sequence of locations of the mobile device 102 in the zones indicating movement of the mobile device 104 within and across the zones). The number of observations in the observation vector 204 can be varied (i.e., selected). The observation vector 204 shows a trajectory or a path in which the person carrying the mobile device 104 moves within and across the zones relative to the vehicle 102.

Next, the intent recognition model 114 determines the person's intent to enter the vehicle 102 as follows. The intent recognition model 114 determines an assignment matrix comprising pairwise transition assignment parameters (or zone transition indicators) $C_{ij}$, where i and j denote zones. $C_{ij}=1$ if a pairwise transition between zones i and j exists in the observation vector 204. $C_{ij}=0$ if a pairwise transition between zones i and j does not exist in the observation vector 204.

The intent recognition model 114 uses heuristic weights 208 that are empirically determined over time by observing many trajectories or paths across the zones generally followed by people in the vicinity of vehicles. FIG. 2B shows the examples of the P, S, and I zones and the heuristic weights 208 more clearly than in FIG. 2A. At 210, using the heuristic weights 208, the intent recognition model 114 determines a weight matrix $W_{ij}$ comprising pairwise transition weights between two adjacent zones for successive transition pairs in the observation vector 204.

In general, for z zones and r observations in the observation vector 204, the total number of possible permutations with repetition is equal to $z^r$. For z=3 and r=10, the total number of possible permutations with repetition is equal to 59,049. All permutations that include the transition between zones P and I are not valid. The heuristic weights 208 are determined by attempting all valid permutations in the observation vector 204. A set of rules are used to select weights for inter-zone and intra-zone transitions.

Figure 3:
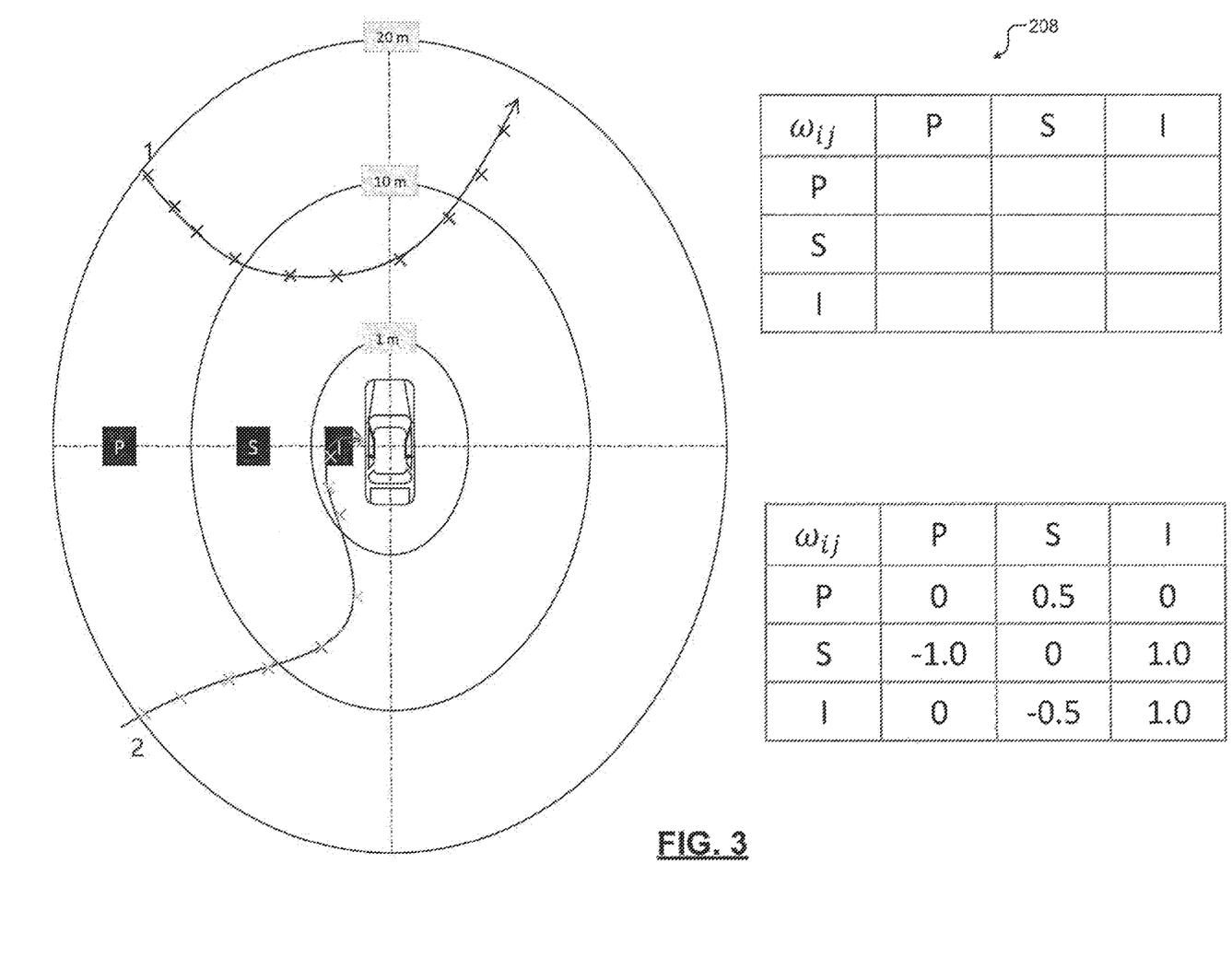
FIG. 3 shows examples of zone determination and intent recognition performed according to the system of FIG. 1 and the method of FIG. 2.

FIG. 3 shows example values of the weights. For example, as shown in the heuristic weights 208, the weights $W_{pp}$ and $W_{ss}$ may be zero (or a very low value) since transitions within the P and S zones (indicated as P followed by P and S followed by S in the observation vector 204) do not indicate an intent to move toward zone I (and therefore toward the vehicle 102). In contrast, the weight $W_{ii}$ may be 1 (or a high positive value) since the transition within zone I indicates a tendency to remain in zone I and therefore closer to the vehicle 102.

The weight $W_{sp}$ may be (−1.0) (or a high negative value) since a transition from zone S to zone P indicates movement away from the vehicle 102 and therefore negates the intent to enter the vehicle 102. The weight $W_{is}$ may be (−0.5) (or a low negative value) since a transition from zone I to zone S indicates a movement away from the vehicle 102 and therefore negates the intent to enter the vehicle 102. However, the weight $W_{is}$ may be (−0.5) (or a low negative value) instead of (−1.0) (or a high negative value) since the transition from zone I to zone S indicates a greater possibility or likelihood that the person may reenter zone I than in case of the transition from zone S to zone P.

The weight $W_{ps}$ may be (0.5) (or a low positive value) since a transition from zone P to zone S indicates movement toward the vehicle 102 although not as strong as a transition from zone S to zone I, which is why the weight $W_{si}$ may be (1.0) (or a high positive value). The weights $W_{pi}$ and $W_{ip}$ may be zero (or a very low value) since the transitions from zone P to zone I and from one I to zone P are invalid.

In FIG. 2A, at 212, the intent recognition model 114 applies the weights from the weight matrix $W_{ij}$ to the zone transitions indicated by the observation vector 204 to determine an intent indicator (e.g., a likelihood of the person entering the vehicle 102). The intent recognition model 114 multiplies the assignment matrix comprising pairwise transition assignment parameters (or zone transition indicators) $C_{ij}$ by the weight matrix $W_{ij}$ and determines a vehicle entering intent indicator using the following equation, where n is the number of observations in the observation vector 204:

$$p_{enter} = \sum_{m=1}^{n-1} \sum_{i \text{ and } j \in \{P,S,I\}} \omega_{ij}^m \times c_{ij}^m$$

At 214, the intent recognition model 114 determines if the vehicle entering intent indicator is greater than zero. A positive indicator concludes that the person intends to enter the vehicle 102, and one or more of the actions described above (e.g., turning on lights, adjusting seat, waking up infotainment system, turning on HVAC system, and so on) are performed before the person actually enters the vehicle 102. If the vehicle entering indicator is negative, then the conclusion is that the person does not intend to enter the vehicle 102, and none of these actions performed, which conserves the battery of the vehicle 102.

FIG. 3 shows examples of the zone determination and the intent recognition processes along with examples of the heuristic weights 208 according to the present disclosure. For example, FIG. 3 shows two sequences of zone transitions followed by a person in the vicinity of a vehicle. The observation vector 204 for Sequence 1 is P,P,P,P,S,S,S,S,P,P. For Sequence 1, by applying the weights from the heuristic weights 208 to the zone transitions in the observation vector 204 and by using the above equation for determining the intent indicator, we get:

$$p_{enter} = \sum_{m=1}^{n} \sum \omega_{ij}^m \times c_{ij}^m =$$

$$\omega_{P \to P} + \omega_{P \to P} + \omega_{P \to P} + \omega_{P \to S} + \omega_{S \to S} + \omega_{S \to S} + \omega_{S \to S} + \omega_{S \to P} + \omega_{P \to P} =$$

$$0 + 0 + 0 + 0.5 + 0 + 0 + 0 - 1.0 + 0 = -0.5$$

Since the intent indicator is negative, the determination is that the person does not intend to enter the vehicle 102.

The observation vector 204 for Sequence 2 is P,P,P,P,S, S,I,I,I,I. For Sequence 2, by applying the weights from the heuristic weights 208 to the zone transitions in the observation vector 204 and by using the above equation for determining the intent indicator, we get:

$$p_{enter} = \sum_{m=1}^{n} \sum \omega_{ij}^m \times c_{ij}^m =$$

$$\omega_{P \to P} + \omega_{P \to P} + \omega_{P \to P} + \omega_{P \to S} + \omega_{S \to S} + \omega_{S \to I} + \omega_{I \to I} + \omega_{I \to I} + \omega_{I \to I} =$$

$$0 + 0 + 0 + 0.5 + 0 + 1 + 1 + 1 + 1 = 4.5$$

Since the intent indicator is positive, which is greater than zero, the determination is that the person does intend to enter the vehicle 102.

Figure 4:
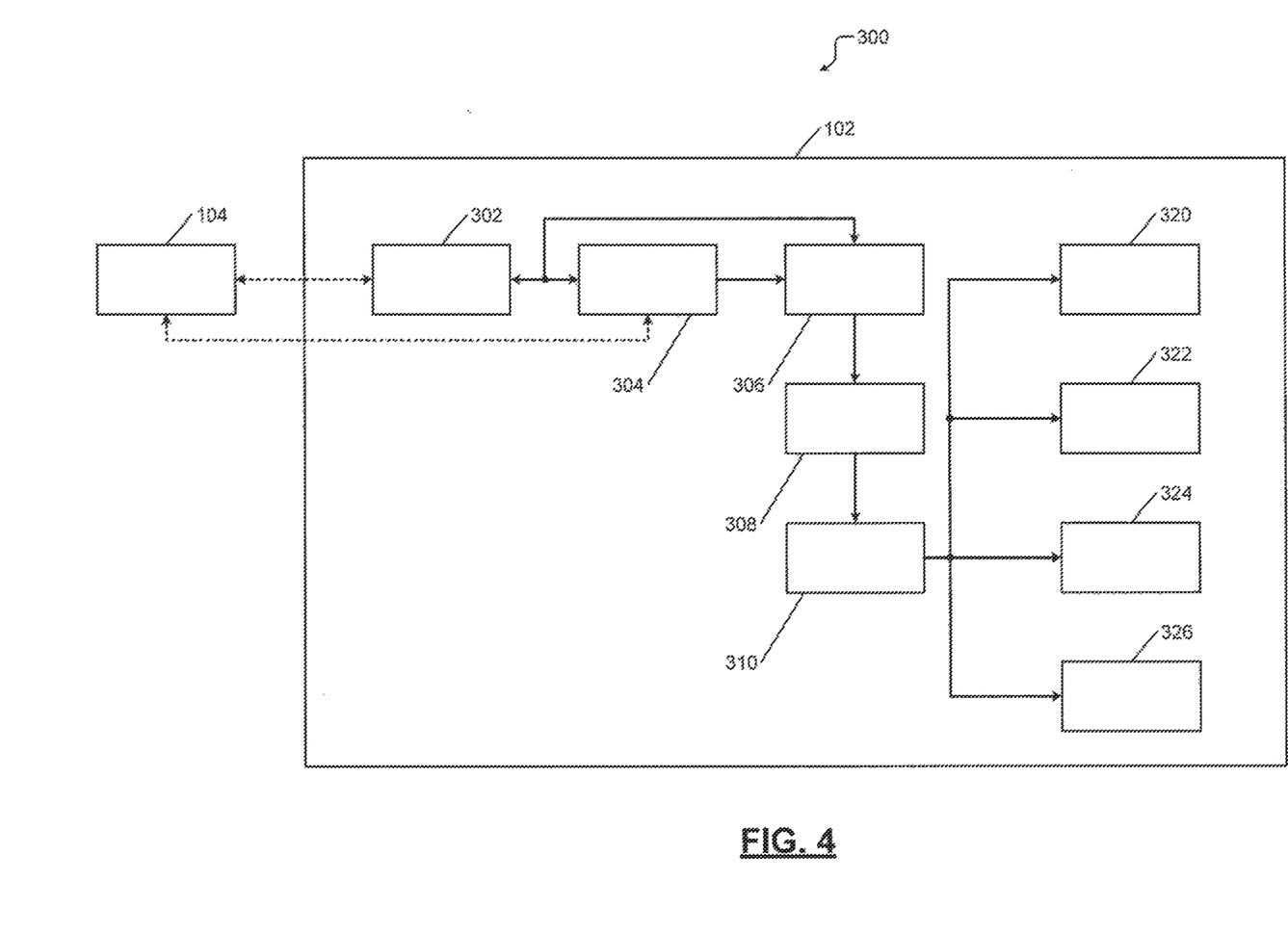
FIG. 4 shows a system implemented in the vehicle for recognizing the intent of a driver/passenger to enter the vehicle according to the present disclosure.

FIG. 4 shows an example of a system 300 that is implemented in the vehicle 102 for recognizing the intent of a driver to enter the vehicle 102 according to the present disclosure. For example, the system 300 comprises the vehicle 102 and the mobile device 104. The mobile device 104 can include a smartphone, a key fob, and so on, which a person typically carries when traveling by the vehicle 102. The mobile device 104 is paired to the vehicle 102. That is, the vehicle 102 can sense, recognize, and authenticate the mobile device 104.

The vehicle 102 comprises a sensing module 302, an authentication module 304, a feature extraction module 306, a zone determination module 308, and an intent determination module 310. The vehicle 102 further comprises one or more of a light control module 320, an infotainment module 322, a seat adjustment module 324, and an HVAC module 326. For example, the modules of the system 300 may be interconnected by a controller area network (CAN) bus in the vehicle. The modules may be further connected to other subsystems and control systems of the vehicle 102 (e.g., an engine control module, and so on) via the CAN bus.

In use, when a person (e.g., a driver or a passenger of the vehicle 102) carrying the mobile device 104 comes in the vicinity of the vehicle 102, the sensing module 302 senses the mobile device 104. Depending on the type of mobile device 104 and the type of sensor or sensors used in the vehicle 102, the sensing module 302 may sense the mobile device 104 by simply receiving signals from the mobile device 104. Alternatively, the sensing module 302 may transmit signals to the mobile device 104 and sense the mobile device 104 by sensing a response from the mobile device 104.

The authentication module 304 authenticates the mobile device 104 (i.e., verifies whether the mobile device 104 is paired with the vehicle 102). If the mobile device 102 is not authenticated (i.e., not recognized as a device paired or registered with or recognized by the vehicle 102), the sensing module 302 continues to look for a mobile device 104 that can be authenticated by the vehicle 102. For example, the authentication process may include performing a handshake and exchanging security information between the authentication module 304 and the mobile device 104. The handshake may be performed directly between the authentication module 304 and the mobile device 104 or via the sensing module 302.

After the mobile device 104 is authenticated, the feature extraction module 306, which is similar to the feature extraction module 110, extracts one or more features (described above) from the signals output by the sensing module 302. The feature extraction module 306 outputs a feature vector comprising one or more features extracted from the signals output by the sensing module 302.

The zone determination module 308, which comprises the zone determination model 112, determines the location of the mobile device 104 relative to the vehicle 102 in a plurality of zones as described above. The zone determination module 308 determines an observation vector (element 204) comprising a plurality of observations of pairwise zone transitions performed by the mobile device 104 as the person carrying the mobile device 104 moves about the vehicle 102.

The intent determination module 310, which comprises the intent recognition model 114, determines whether the person carrying the mobile device 104 intends to enter the vehicle 102 using the observation vector and heuristic weights (element 208) as described above. Depending on the intent of the person to enter or not enter the vehicle 102 as determined by the intent determination module 310, one or more of the following operations are performed or are not performed before the person enters the vehicle 102.

For example, the light control module 320 can turn on one or more lights (e.g., dome light, headlights, etc.) of the vehicle 102. The infotainment module 322 can boot the infotainment system of the vehicle 102. The seat adjustment module 324 may adjust the seat if necessary (e.g., if another driver had previously changed and used a seat adjustment that is different than the preference of the person entering the vehicle 102). The HVAC module 326 can turn on the air conditioning system of the vehicle 102 (e.g., to heat or cool the interior of the vehicle to a temperature preferred by the person entering the vehicle 102, to defog and/or defrost the windows and mirrors, and so on). Many other subsystems of the vehicle 102 can be operated before the person actually enters the vehicle 102. These operations may include but are not limited to starting engine ignition, opening sunroof and/or other windows, putting the top down (if the vehicle 102 is convertible), operating lift-gate/tailgate, opening/closing trunk/hatchback/door, and so on.

Figure 5:
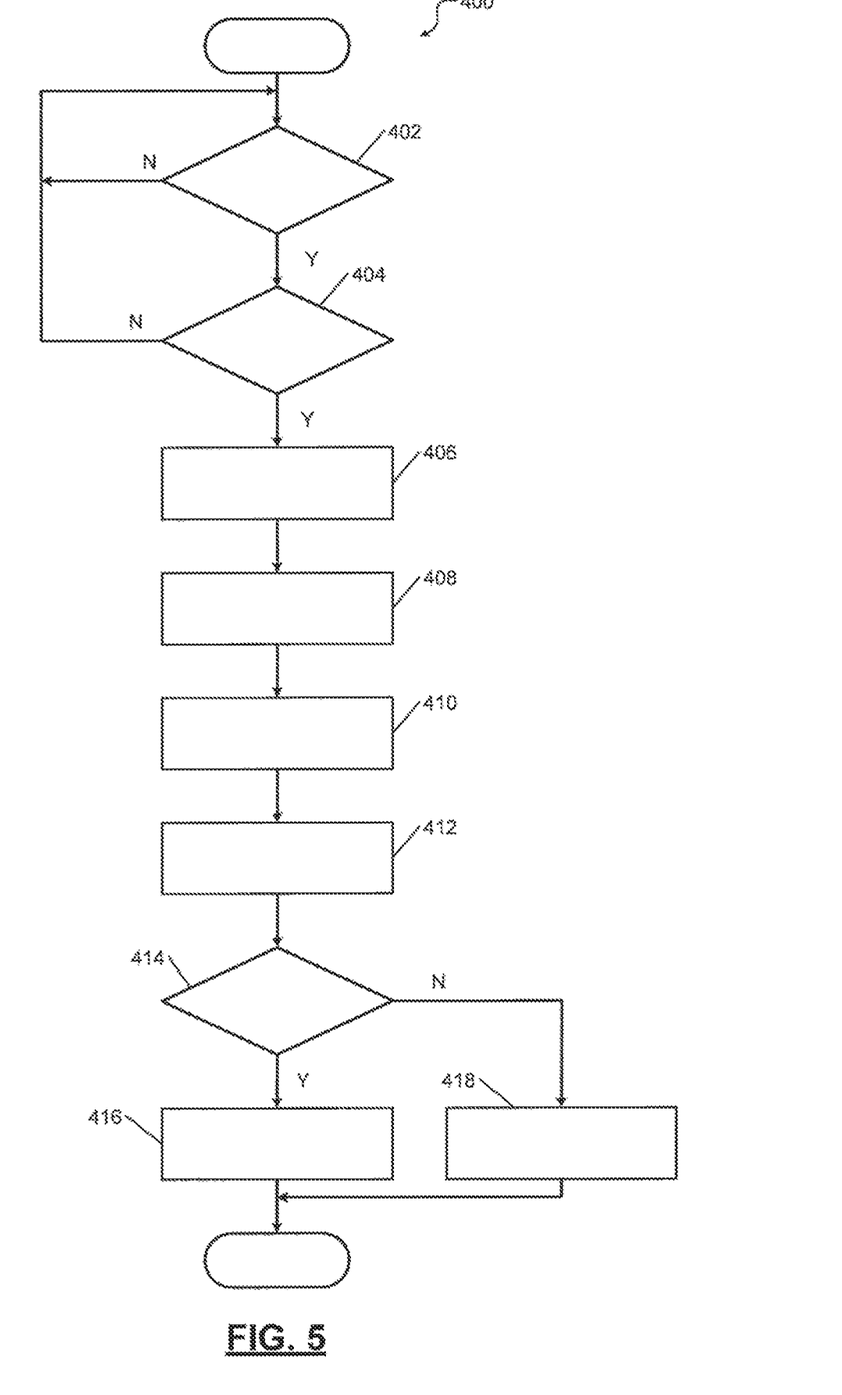
FIG. 5 shows a method implemented in the vehicle for recognizing the intent of a driver/passenger to enter the vehicle according to the present disclosure.

FIG. 5 shows an example of a method 400 implemented in the vehicle 102 for recognizing the intent of a driver (or a passenger) to enter the vehicle 102 according to the present disclosure. For example, the method 400 can be performed by any of the systems 100, 200, and 300. The term control used below indicates operations performed by one or more elements of any of the systems 100, 200, and 300.

At 402, control senses a mobile device (e.g., element 104) in the vicinity of the vehicle (e.g., element 102). Control continues to look for a mobile device until it senses a mobile device in the vicinity of the vehicle. At 404, after a mobile device is sensed in the vicinity of the vehicle, control attempts to authenticate the detected mobile device (i.e., control verifies whether the sensed mobile device is known to the vehicle 102). Control returns to 402 if the detected mobile device cannot be authenticated.

At 406, after the sensed mobile device is authenticated, control begins a zone determination process using a trained zone determination model. For example, using elements 110 and 112, control extracts features from sensor signals and determines the location of the mobile device relative to the vehicle. At 408, control determines an observation vector (e.g., element 112 outputs element 204).

At 410, control applies weights to zone transitions found in the observation vector. At 412, control determines an intent indicator of the person entering the vehicle. At 414, control determines if the intent indicator is positive (i.e., if the person intends to enter the vehicle). At 416, control performs one or more operations in the vehicle that are desired or preferred by the person if the intent indicator is positive (e.g., turn on lights, boot infotainment system, adjust seat, start VHAC system, etc.). At 418, control does not perform any of the operations desired or preferred by the person if the intent indicator is less than or equal to zero.

Figure 6:
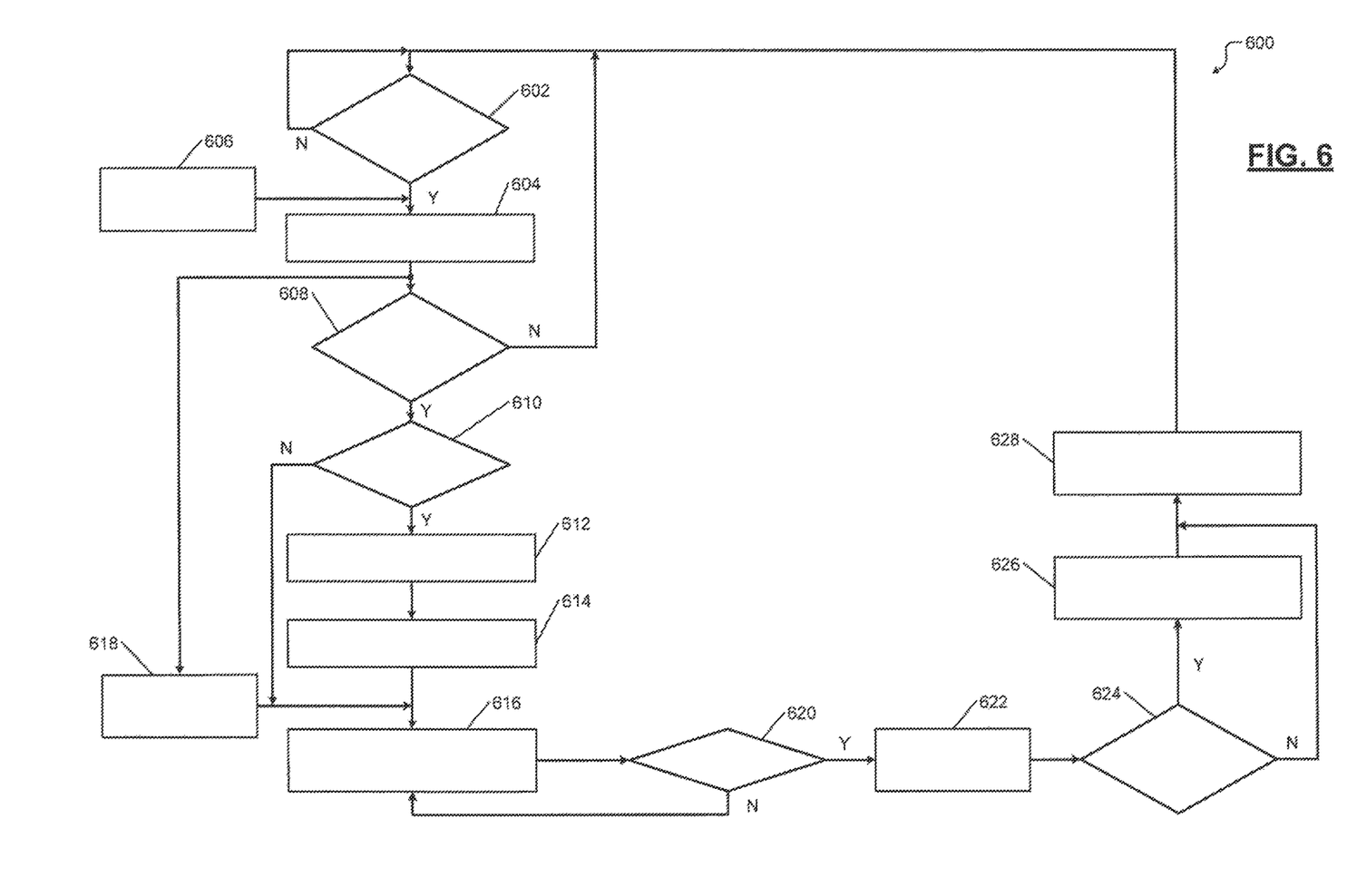
FIG. 6 shows a method implemented in the vehicle for recognizing the intent of a driver/passenger to enter the vehicle and providing smart welcome using adaptive timers according to the present disclosure.

FIG. 6 shows an example of a method 500 implemented in the vehicle 102 for recognizing the intent of a driver or a passenger to enter the vehicle and providing smart welcome using two adaptive timers according to the present disclosure. Essentially, the smart welcome prevents the vehicle 102 from providing repeated welcome (e.g., turning on lights) due to sensed activity of a person with an authorized phone around the vehicle 102, which can be annoying and which can also drain the battery of the vehicle 102. For example, the method 500 can be performed by any of the systems 100, 200, and 300. The term control used below indicates operations performed by one or more elements of any of the systems 100, 200, and 300.

At 602, control determines whether an authorized smartphone is detected by the vehicle. At 604, if an authorized smartphone is detected by the vehicle, control begins zone determination using data about the smartphone's movement received from sensors in the vehicle (shown at 606). At 608, control determines if the person carrying the smartphone has moved or entered into a welcome zone (e.g., within 10 meters of the vehicle, which is a programmable parameter). Control returns to 602 if the person carrying the smartphone has not yet moved or entered into a welcome zone.

At 610, if the person carrying the smartphone has moved or entered into a welcome zone, control determines whether a first timer (called a welcome zone timer) has expired. At 612, if the first timer has expired, control sets a second timer (called an exit welcome zone timer) to zero; and at 614, control activates a welcome indication (e.g., turns on lights) in the vehicle. This happens after the person's first entry into the welcome zone. This welcome indication typically turns off after a fixed duration (e.g., the lights may turn off after a minute or so). The method 600 ensures that this indication is not turned on repeatedly due to the sensed activity of the person with the authorized phone around the vehicle.

At 616, after 614 or if the first timer has not yet expired at 610, control performs intent recognition (i.e., determines intent to enter the vehicle) using the zone observation vector (shown at 618) formed using the zone determination model as described above. At 620, control determines if intent to enter the vehicle is detected. Control continues to perform intent recognition at 616 if intent to enter the vehicle is not yet detected at 620. By this time, the welcome indication turned on at 614 typically turns off, and method 600 ensures that this indication is not turned on repeatedly due to the sensed activity of the person with the authorized phone around the vehicle using the second timer as follows.

At 622, if intent to enter the vehicle is detected, control increments the second timer. At 624, control determines if the value of the second timer is greater than a programmable threshold T (e.g., T=3 minutes). At 626, if the value of the second timer is greater than a programmable threshold T, control sets the value of the second timer equal to the programmable threshold T. At 628, after 626 or if the value of the second timer is not greater than the programmable threshold T at 624, control sets the value of the first timer to the value of the second timer plus T. Control proceeds to 602.

Thus, by using the two timers, which are adaptive as described above, the method 600 provides the vehicle the ability to provide the welcome indication only when the person intends to enter the vehicle and prevents the vehicle from providing the welcome indication repeatedly upon sensing the person's repeated entries and exits in and out of the welcome zone.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip (SoC).

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, Python® or *Julia*.

What is claimed is:

1. A system implemented in a vehicle, the system comprising:
   a sensing module configured to sense a signal from a mobile device proximate to the vehicle;
   a zone determination module configured to determine locations of the mobile device in a plurality of zones around the vehicle based on the signal, wherein a sequence of the locations indicates movement of the mobile device in the plurality of zones; and
   an intent determination module configured to:
   select weights according to a set of rules to apply to successive locations in the sequence;
   determine an intent indicator of whether a person carrying the mobile device intends to enter the vehicle by applying the selected weights to the successive locations in the sequence; and
   generate an output to perform one or more operations in the vehicle based on the intent indicator.

2. The system of claim 1 wherein the one or more operations include turning on one or more lights, sounding a horn, booting an infotainment module, adjusting a seat, turning on an air conditioning system, and turning on ignition.

3. The system of claim 1 further comprising an authentication module configured to authenticate the mobile device by performing a security handshake with the mobile device.

4. The system of claim 1 further comprising:
   a feature extraction module configured to extract data from the signal and to output a feature vector based on the extracted data,
   wherein the zone determination module comprises a model trained to determine the locations of the mobile device in the plurality of zones based on the feature vector.

5. The system of claim 1 wherein the sensing module comprises one or more sensors configured to communicate with the mobile device using a short-range wireless communication protocol.

6. The system of claim 1 wherein:
   the zone determination module comprises a model trained to determine the locations of the mobile device in the plurality of zones; and
   the model is trained based on a type of a sensor used in the sensing module, a location of the sensor in the vehicle, a type of the mobile device, and a communication protocol used by the sensor to communicate with the mobile device.

7. The system of claim 1 wherein the sensing module comprises one or more Bluetooth sensors and wherein the signal includes a Bluetooth Low Energy signal.

8. The system of claim 1 wherein the intent determination module is configured to determine the intent indicator of whether a person carrying the mobile device intends to enter the vehicle by analyzing pairwise transitions of the mobile device between the plurality of zones around the vehicle and by using the weights corresponding to the pairwise transitions.

9. The system of claim 1 wherein the intent determination module is configured to prevent repeated performance of the one or more operations in the vehicle in response to sensing repeated movements of the mobile device between the plurality of zones by using a plurality of adaptive timers until determining that the person carrying the mobile device intends to enter the vehicle.

10. A non-transitory computer-readable medium storing instructions for execution by a processor, the instructions comprising:
    first instructions for processing a signal received from a sensor in a vehicle in response to sensing a mobile device proximate to the vehicle;
    second instructions for extracting data from the signal and determining locations of the mobile device in a plurality of zones around the vehicle, wherein a sequence of the locations indicates movement of the mobile device in the plurality of zones; and
    third instructions for:
    selecting weights according to a set of rules to apply to successive locations in the sequence;

determining an intent indicator of whether a person carrying the mobile device intends to enter the vehicle by applying the selected weights to the successive locations in the sequence; and generating an output to perform one or more operations in the vehicle based on the intent indicator.

11. The non-transitory computer-readable medium of claim 10 wherein the one or more operations include turning on one or more lights, sounding a horn, booting an infotainment module, adjusting a seat, turning on an air conditioning system, and turning on ignition.

12. The non-transitory computer-readable medium of claim 10 further comprising fourth instructions for performing a security handshake with the mobile device and authenticating the mobile device.

13. The non-transitory computer-readable medium of claim 10 further comprising fourth instructions for:
determining a feature vector based on the extracted data;
inputting the feature vector to a model trained to determine the locations of the mobile device in the plurality of zones based on the feature vector; and
receiving from the model the locations of the mobile device in the plurality of zones around the vehicle.

14. The non-transitory computer-readable medium of claim 10 further comprising fourth instructions for determining the locations of the mobile device in the plurality of zones using a model trained based on a type of the sensor, a location of the sensor in the vehicle, a type of the mobile device, and a communication protocol used by the sensor to communicate with the mobile device.

15. A method comprising:
a mobile device proximate to a vehicle sensing a signal from a transmitter in the vehicle;
determining locations of the mobile device in a plurality of zones around the vehicle based on the signal, wherein a sequence of the locations indicates movement of the mobile device in the plurality of zones;
selecting weights according to a set of rules to apply to successive locations in the sequence;
determining an intent indicator of whether a person carrying the mobile device intends to enter the vehicle by applying the selected weights to the successive locations in the sequence; and
performing one or more operations in the vehicle based on the intent indicator.

16. The method of claim 15 wherein the one or more operations include turning on one or more lights, sounding a horn, booting an infotainment module, adjusting a seat, turning on an air conditioning system, and turning on ignition.

17. The method of claim 15 further comprising authenticating the mobile device by performing a security handshake with the mobile device.

18. The method of claim 15 further comprising:
extracting data from the signal;
determining a feature vector based on the extracted data;
inputting the feature vector to a model trained to determine the locations of the mobile device in the plurality of zones based on the feature vector; and
receiving from the model the locations of the mobile device in the plurality of zones around the vehicle.

19. The method of claim 15 further comprising determining the locations of the mobile device in the plurality of zones using a model trained based on a type of a sensor, a location of the sensor in the vehicle, a type of the mobile device, and a communication protocol used by the sensor to communicate with the mobile device.

20. The method of claim 15 further comprising communicating with the mobile device using a short-range wireless communication protocol.

* * * * *